US012416968B2

(12) United States Patent
Olson et al.

(10) Patent No.: US 12,416,968 B2
(45) Date of Patent: Sep. 16, 2025

(54) TECHNIQUES FOR SWITCHING BETWEEN IMMERSION LEVELS

(71) Applicant: APPLE INC., Cupertino, CA (US)

(72) Inventors: Earl M. Olson, Santa Clara, CA (US); Nicolai Georg, Sunnyvale, CA (US); Omar R. Khan, Sunnyvale, CA (US); James M. A. Begole, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/207,197

(22) Filed: Jun. 8, 2023

(65) Prior Publication Data

US 2023/0324985 A1 Oct. 12, 2023

Related U.S. Application Data

(63) Continuation of application No. 17/048,200, filed as application No. PCT/US2019/030100 on May 1, 2019, now Pat. No. 11,709,541.

(60) Provisional application No. 62/668,525, filed on May 8, 2018.

(51) Int. Cl.
*G06F 3/01* (2006.01)
*G06F 3/0362* (2013.01)

(52) U.S. Cl.
CPC ............ *G06F 3/011* (2013.01); *G06F 3/0362* (2013.01)

(58) Field of Classification Search
CPC .............................................. G06F 3/011–013
See application file for complete search history.

(56) References Cited

U.S. PATENT DOCUMENTS

| 8,040,361 | B2 | 10/2011 | Bachelder et al. |
| 8,988,465 | B2 * | 3/2015 | Baron ................ G06F 30/00 345/632 |
| 9,865,089 | B2 | 1/2018 | Burns et al. |
| 10,896,219 | B2 | 1/2021 | Tokuchi |

(Continued)

FOREIGN PATENT DOCUMENTS

| CN | 106796417 A | 5/2017 |
| WO | 2016051366 | 4/2016 |

OTHER PUBLICATIONS

China National Intellectual Property Administration, Office Action issued Nov. 9, 2023, which pertains to Chinese Patent Application No. 201980030129.8, filed May 1, 2019. 11 pgs.

(Continued)

*Primary Examiner* — Hang Lin
(74) *Attorney, Agent, or Firm* — Thompson Hine LLP

(57) ABSTRACT

In one implementation, a non-transitory computer-readable storage medium stores program instructions computer-executable on one or more processors of an electronic device to perform operations. The operations include presenting, on a display of the electronic device, a simulated reality (SR) environment at a first immersion level, where the first immersion level is associated with a first location of a reality boundary. Using a rotatable input device of the electronic device, input is received representing a request to change the first immersion level to a second immersion level. In accordance with receiving the input, the SR environment is presented at the second immersion level, where the second immersion level is associated with a second location of the reality boundary.

24 Claims, 9 Drawing Sheets

(56) References Cited

U.S. PATENT DOCUMENTS

| | | |
|---|---|---|
| 10,930,082 B2 | 2/2021 | Singh |
| 2012/0086624 A1 | 4/2012 | Thompson |
| 2015/0042679 A1* | 2/2015 | Jarvenpaa ............. G06F 3/0304 345/633 |
| 2016/0100817 A1* | 4/2016 | Hussain ................... A61B 7/04 600/528 |
| 2016/0196694 A1 | 7/2016 | Lindeman |
| 2016/0349509 A1 | 12/2016 | Lanier et al. |
| 2017/0200310 A1 | 7/2017 | Kapinos et al. |
| 2017/0285737 A1 | 10/2017 | Khalid et al. |
| 2017/0294046 A1 | 10/2017 | Soda et al. |
| 2020/0272190 A1* | 8/2020 | Von Euler ............. G06F 3/0354 |
| 2020/0394012 A1 | 12/2020 | Wright, Jr. et al. |

OTHER PUBLICATIONS

China National Intellectual Property Administration, Patent Search Report issued Nov. 9, 2023, which pertains to Chinese Patent Application No. 201980030129.8, filed May 1, 2019. 2 pgs.

PCT, European Patent Office, International Search Report and Written Opinion of the International Searching Authority, International Application No. PCT/US2019/030100, 16 pages (Jul. 15, 2019).

China National Intellectual Property Administration, Office Action issued Nov. 9, 2023, which pertains to Chinese Patent Application No. 201980030129.8. English Translation. 2 pgs.

* cited by examiner

TECHNIQUES FOR SWITCHING BETWEEN IMMERSION LEVELS

CROSS-REFERENCE TO RELATED APPLICATIONS

This application is a continuation of a U.S. application Ser. No. 17/048,200, filed Oct. 16, 2020, which claims the benefit of a 371 National Phase, International Application No. PCT/US2019/030100, filed May 1, 2019, which claims the benefit of U.S. Provisional Patent Application No. 62/668,525, filed May 8, 2018, each of which is incorporated by reference herein in its entirety.

TECHNICAL FIELD

The present disclosure generally relates to systems, methods, and devices for selectively transitioning between levels of simulated reality (SR) immersion presented by an electronic device, and in particular, to selectively transitioning between levels of SR immersion using an input device of the electronic device.

BACKGROUND

Electronic devices, such as head-mounted devices (also known as headsets) are often used in systems to present a user with virtual objects that either complement or replace a surrounding physical setting that is perceivable in a view presented by a display of such electronic devices. Through that view, the user is provided with an experience in which they may be fully immersed in a surrounding physical setting, fully immersed in a virtual reality (VR) setting of virtual objects, or anywhere in between.

While the user is fully or partially immersed in a VR setting of virtual objects, physical objects in the surrounding physical setting continue to exist. For example, the user may be fully immersed in VR corresponding to a pre-historic world populated with dinosaurs. While that virtual pre-historic world may be deficient in living room furniture, the living room in which the user is located continues to include a coffee table. Moreover, even though the user's dog may be absent from that virtual pre-historic world, the dog may continue to roam about the living room.

An existing technique to avoid any undesirable interactions with physical objects in the surrounding physical setting that are unencumbered by the virtual reality setting involves a user abruptly removing the electronic device providing the experience upon sensing such undesirable interactions. However, as experiences become increasingly immersive, the user may be unable to sense such undesirable interactions fast enough to avoid them. Moreover, abruptly removing the electronic device during an experience detracts from that experience. As such, it is desirable to address the concerns related to these undesirable interactions while also minimizing any negative impacts on the experience.

SUMMARY

Various implementations disclosed herein include devices, systems, and methods for selectively transitioning between levels of simulated reality (SR) immersion. In one implementation, a non-transitory computer-readable storage medium stores program instructions computer-executable on a computer to perform operations. The operations include presenting first content representing a virtual reality (VR) setting on a display of an electronic device. Using an input device of the electronic device, input is received representing a request to present a view corresponding to a physical setting in which the electronic device is located. In accordance with receiving the input, the first content is simultaneously presented on the display with second content representing the view corresponding to the physical setting obtained using an image sensor of the electronic device.

In another implementation, an electronic device includes a display, an image sensor, and an input device that are each communicatively coupled to a processor of the electronic device. The display is configured to present first content representing a virtual reality setting, second content representing a view corresponding to a physical setting in which the electronic device is located, or a combination thereof. The image sensor is configured to obtain the second content representing the view corresponding to the physical setting. The input device is configured to receive inputs representing requests to selectively transition between only presenting the first content in the display and only presenting the second content in the display.

In another implementation, an electronic device includes an output device, a sensor, and an input device that are each communicatively coupled to a processor of the electronic device. The output device is configured to present first sensory content corresponding to a virtual reality setting, second sensory content corresponding to a physical setting in which the electronic device is located, or a combination thereof. The sensor is configured to obtain the second sensory content corresponding to the physical setting. The input device is configured to receive inputs representing requests to transition from only presenting the first sensory content with the output device, to presenting a combination of the first sensory content and the second sensory content with the output device, to only presenting the second sensory content with the output device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
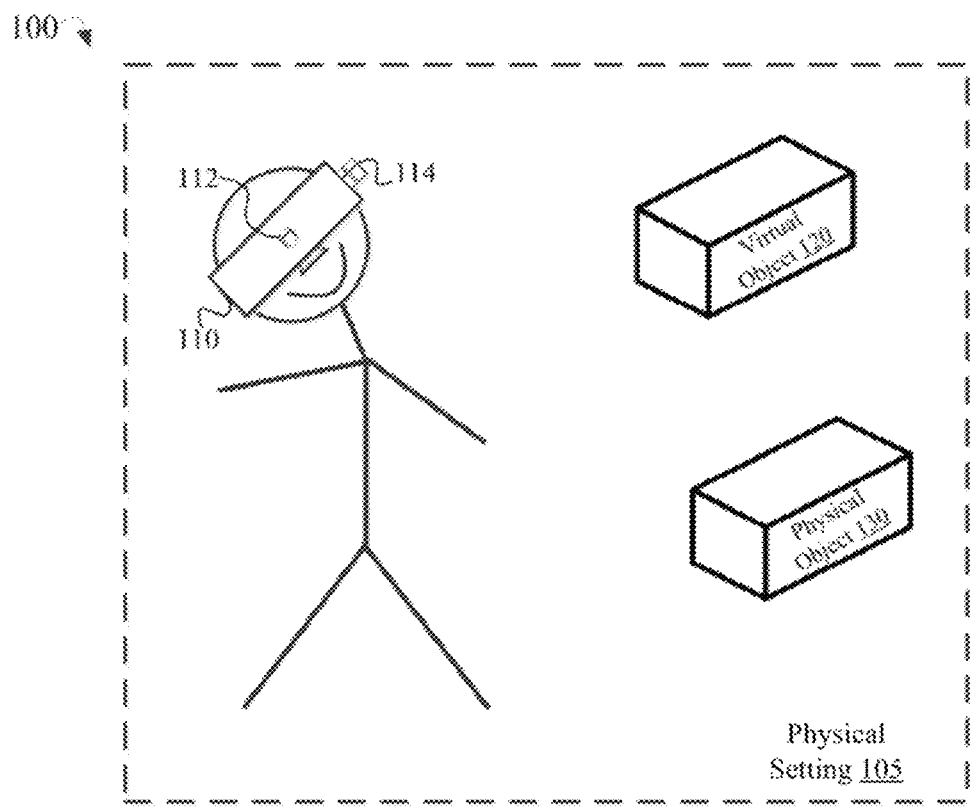
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present invention is illustrated and designated generally 100. In general, operating environment 100 illustrates a device 110 configured to present content to a user on a display. The content may represent a view of a physical setting or physical (real-world) environment proximate to device 110 (e.g., physical setting 105). A "physical setting" refers to a world that individuals can sense or with which individuals can interact without assistance of electronic systems. Physical settings (e.g., a physical forest) include physical objects (e.g., physical trees, physical structures, and physical animals). Individuals can directly interact with or sense the physical setting, such as through touch, sight, smell, hearing, and taste.

In some implementations, the device 110 is configured with a suitable combination of software, firmware, or hardware to manage and coordinate a simulated reality (SR) experience for the user. In some implementations, a controller (not shown) separate from device 110 includes a suitable combination of software, firmware, or hardware to facilitate the SR experience on the device 110. In some implementations, the controller is a computing device that is local or remote relative to the physical setting 105 and in communication with the device 110. In one example, the controller is a local server located within the physical setting 105. In another example, the controller is a remote server located outside of the physical setting 105 (e.g., a cloud server, central server, etc.). In some implementations, the controller is communicatively coupled with the device 110 via one or more wired or wireless communication channels (e.g., BLUETOOTH, IEEE 802.11x, IEEE 802.16x, IEEE 802.3x, etc.).

According to some implementations, the device 110 presents a simulated reality (SR) experience to the user while the user is present within the physical setting 105. In contrast to the physical setting 105, a SR setting refers to an entirely or partly computer-created setting that individuals can sense or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with or sense a SR object using any one of his senses, including touch, smell, sight, taste, and sound. For example, an individual may interact with or sense aural objects that create a multi-dimensional (e.g., three dimensional) or spatial aural setting, or enable aural transparency. Multi-dimensional or spatial aural settings provide an individual with a perception of discrete aural sources in a multi-dimensional space. Aural transparency selectively incorporates sounds from the physical setting, either with or without computer-created audio. In some SR settings, an individual may interact with or sense only aural objects.

One example of SR is virtual reality (VR). A VR setting refers to a simulated setting that is designed only to include computer-created sensory inputs for at least one of the senses. A VR setting includes multiple virtual objects with which an individual may interact or sense. An individual may interact or sense virtual objects in the VR setting through a simulation of a subset of the individual's actions within the computer-created setting, or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation or location with respect to the physical setting to enable interaction between virtual objects and real objects (which are physical objects from the physical setting or representations thereof). For example, a system may monitor movements so that a virtual plant appears stationary with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of, but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical object captured by imaging sensor(s). In another example, a virtual object may exhibit characteristics consistent with actual weather conditions in the physical setting, as identified via imaging, weather-related sensors, or online weather data. In yet another example, an augmented reality forest may have virtual trees and structures, but the animals may have features that are accurately reproduced from images taken of physical animals.

Many electronic systems enable an individual to interact with or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) or microphones for taking images/video or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

In general, in FIG. 1, the operating environment 100 illustrates a device 110 configured to present a user with a simulated reality ("SR") experience in which the user is presented with sensory content corresponding to a physical setting in which device 110 is located, sensory content representing a virtual reality ("VR") setting, or any combination thereof. Stated differently, device 110 is configured to present a user with various levels of immersion in which the user is fully immersed in the physical setting, fully immersed in the VR setting (e.g., a VR experience), or partially immersed in the VR setting and partially immersed in the physical setting (e.g., a mixed reality ("MR") experience).

As used herein, "sensory content" or "content" generally refers to attributes or characteristic of an external stimuli in a physical setting that is perceivable by one or more sensory organs of a user. Examples of "sensory content" or "content" include auditory content, visual content, tactile content, olfactory content, gustatory content, or combinations thereof.

"Sensory content" or "content" may be distinguishable on the basis of where it originates. For example, natural/physical sensory content may originate from a physical (real-world) setting proximate to device 110 (e.g., physical setting 105). As such, physical sensory content is perceivable by a user with or without device 110. In contrast, virtual sensory content refers to sensory content that is generated or at least processed by a computing device (e.g., device 110). Virtual sensory content may include two-dimensional ("2D") and/or three-dimensional ("3D") graphical/image content, sounds, tactile feedback, and the like, which is generated or at least processed by a computing device. As such, virtual sensory content is not perceivable by a user without a computing device.

One level of SR immersion involves fully immersing the user in a VR setting as part of an SR experience. At that level of immersion, physical sensory content corresponding to a physical setting proximate to device 110 (e.g., physical setting 105) is replaced with virtual sensory content. This level of immersion may be described as a VR experience. For example, to present a user with an experience fully based on visual sensory content, only visual sensory content corresponding to a VR setting is presented on a display of device 110. If the VR setting represents a pre-historic world populated with dinosaurs, only visual sensory content corresponding to that pre-historic world would be presented on the display of device 110. In this example, if physical object 130 is a family dog and virtual object 120 is a dinosaur of the pre-historic world, only visual sensory content corresponding to the dinosaur (i.e., virtual object 120) would be presented on the display of device 110, as part of the SR experience. As such, in the SR experience of this example, the dinosaur and associated virtual sensory content (e.g., images of terrain and fauna from the pre-historic world) would replace the family dog and other physical sensory content associated with physical setting 105 (e.g., images of a couch and a coffee table) in a field of view of the user.

Another level of SR immersion involves partially immersing the user in a VR setting and partially immersing the user in a physical setting proximate to device 110 (e.g., physical setting 105), as part of an SR experience. At this level of immersion, physical sensory content corresponding to the proximate physical setting is supplemented with virtual sensory content. As part of the MR experience, the physical setting provides a reference framework into which the virtual sensory content is introduced. Continuing with the example above, physical sensory content corresponding to the family dog and virtual sensory content corresponding to the dinosaur would both be presented on the display of device 110, as part of the MR experience. As such, in the SR experience of this example, at least a subset of visual sensory content corresponding to the pre-historic world (e.g., the dinosaur) would coexist with at least a subset of visual sensory content corresponding to physical setting 105 (e.g., the family dog) in a field of view of the user.

Yet another level of SR immersion involves fully immersing the user in a physical setting proximate to device 110 (e.g., physical setting 105), as part of an SR experience. At this level of immersion, only physical sensory content corresponding to the proximate physical setting is presented to the user. Continuing with the example above, only physical sensory content corresponding to the family dog would be presented on the display of device 110, as part of the MR experience. As such, in the SR experience of this example, no visual sensory content corresponding to the pre-historic world (e.g., the dinosaur) would be present in a field of view of the user.

In one implementation, elements of a physical setting proximate to device 110 (e.g., physical object 130) interact with elements of a virtual setting (e.g., virtual object 120) during an SR experience. In this implementation using the example above, a user may perceive the family dog chasing the dinosaur (or vice versa), as part of the SR experience. In one implementation, elements of a physical setting proximate to device 110 may not interact with elements of a virtual setting during an SR experience. In this implementation using the example above, a user may not perceive any interaction between the family dog and the dinosaur.

In one implementation, as part of the SR experience, the user may interact with both virtual objects in the pre-historic world and physical objects in physical setting 105 using physical objects from physical setting 105 that are unassociated with device 110. Using the example above, if the user picks up a ball from the couch and throws that ball, the family dog and the dinosaur may both chase that ball. That ball may both inadvertently knock over a vase resting on the coffee table and disturb leaves of a tree from the pre-historic world during the MR experience.

Device 110 is shown as a head-mounted device ("HMD") in the example depicted by FIG. 1. Those skilled in the art will recognize that an HMD is but one form factor that is suitable for implementing device 110. Other form factors that are suitable for implementing device 110 include smartphones, AR glasses, smart glasses, desktop computers, laptops, tablets, computing devices, and the like. In some implementations, device 110 includes a suitable combination of software, firmware, and/or hardware. For example, device 110 may include sensor 112, input device 114, and an output device (e.g., display 230 of FIG. 2). Examples of suitable devices for implementing the output device include a display, an audio speaker, a haptic device, and the like. In one implementation, device 110 includes an output device disposed on an inward facing surface of device 110.

Sensor 112 is configured to obtain physical sensory content corresponding to a physical setting (e.g., physical setting 105) in which device 110 is located. Sensor 112 may be implemented using any element or device that is capable of obtaining such physical sensory content, such as image sensors, tactile sensors, auditory sensors, and the like. In one implementation, sensor 112 is an image sensor that is part of an array of image sensors configured to capture light field images corresponding to a physical setting (e.g., physical setting 105) in which device 110 is located.

Input device 114 is configured to receive inputs representing requests to transition from only presenting the first sensory content with the output device, to presenting a combination of the first sensory content and the second sensory content with the output device, to only presenting the second sensory content with the output device. In some respects input device 114 may be analogous to a "home" button for a user during an SR experience in that input device 114 facilitates transitioning between the SR experience and a physical setting in which device 110 is located. In one implementation, input device 114 is disposed on an outward facing surface of device 110. In one implementation, input device 114 is disposed on an exterior surface of device 110.

In one implementation, input device 114 is further configured to physically detach from device 110. In one implementation, input device 114 is further configured to remain communicatively coupled with a processor of device 110 when physically detached from device 110. In one implementation, input device 114 is communicatively coupled with the processor of device 110 via one or more wired and/or wireless communication channels (e.g., BLUETOOTH, IEEE 802.11x, IEEE 802.16x, IEEE 802.3x, and the like). In one implementation, input device 114 is communicatively coupled with a processor of a computing device external to device 110 via one or more wired and/or wireless communication channels. In one implementation, the computing device external to device 110 is a local server (e.g., a video game console) within physical setting 105, a remote server (e.g., a cloud server, an application server, a central server, and the like) external to physical setting 105, or a combination thereof.

In one implementation, input device 114 includes a hardware input device, a software interface element, or a combination thereof. Examples of hardware input devices include: switches, buttons, trackballs, rotatable devices (e.g., knobs), scroll wheels, joysticks, keyboards, hardware sliders, an inertial measurement unit ("IMU"), and the like. Examples of software interface elements include: checkboxes, radio buttons, dropdown lists, list boxes, buttons, toggles, text fields, icons, software sliders, softkeys, virtual keyboards, and the like. In one implementation, a software interface element is presented within a graphical user interface ("GUI"). In one implementation, input device 114 includes a voice assistant application executing in a computing setting and an auditory sensor (e.g., a microphone) providing auditory input to the voice assistant application via an application programming interface ("API").

While examples herein describe virtual sensory content and physical sensory content in terms of visual sensory content, implementations are not limited to visual sensory content, but rather may include any type of sensory content described above with respect to FIG. 1 when an electronic device includes appropriate sensors and output devices. For example, aspects of the present disclosure are equally applicable to auditory content when an electronic device includes appropriate sensors and output devices, such as a microphone and speaker, respectively.

Figure 2:
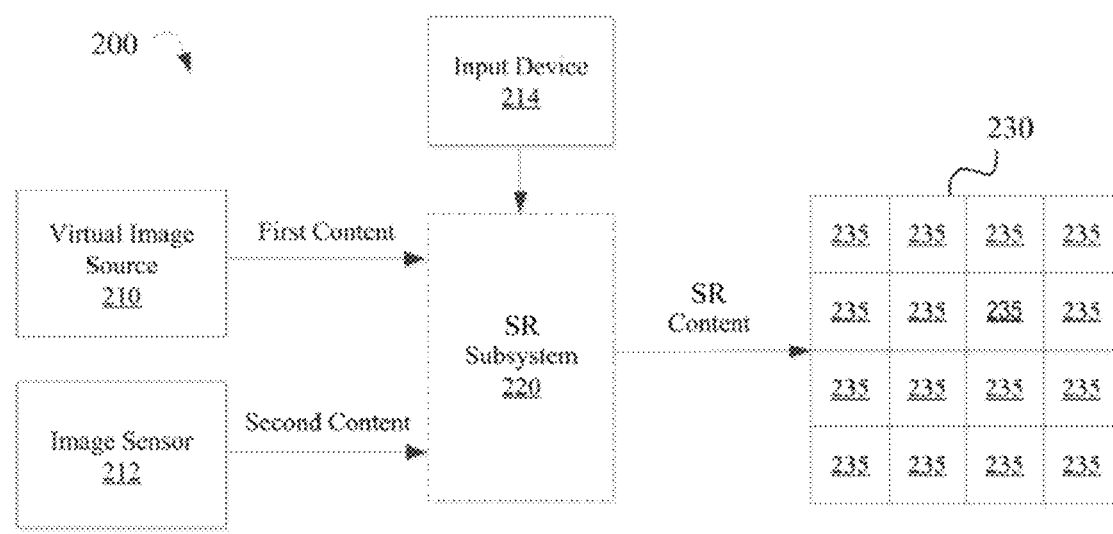
FIG. 2 is a block diagram of an example computing environment that is suitable for implementing aspects of the present disclosure.

Turning to FIG. 2, an example computing setting 200 for implementing aspects of the present invention is illustrated and designated generally 200. Computing setting 200 of FIG. 2 includes virtual image source 210, image sensor 212, input device 214, SR subsystem 220, and display 230. In one implementation, computing setting 200 is effectuated using an electronic device, such as device 110 of FIG. 1. The components shown in FIG. 2 are described in brief and with an emphasis on function for the sake of simplicity. Computing setting 200 is but one example of a suitable computing setting and is not intended to suggest any limitation as to the scope of use or functionality of the present invention. Neither should the computing setting 200 be interpreted as having any dependency or requirement relating to any one or combination of elements illustrated.

One skilled in the art can appreciate that the example elements depicted in FIG. 2 are illustrated to provide an operational framework for describing the present invention. Accordingly, in some implementations, arrangement and composition of each computing setting may vary depending on different implementation schemes. In this implementation, image sensor 212 and input device 214 are implementations of sensor 112 and input device 114, respectively. Also, in this implementation, display 230 is an implementation of the output device of device 110, which is not depicted in FIG. 1.

Virtual image source 210 is configured to generate visual sensory content representing a VR setting for presentation on display 230 ("virtual content"). In one implementation, virtual image source 210 includes a computer graphics application (pipeline). Examples of suitable computer graphics applications include vector graphics editors, raster graphics editors, 3D modelers, and the like.

In one implementation, virtual image source 210 is effectuated using computing resources provided by an electronic device effectuating computing setting 200. In one implementation, at least a portion of virtual image source 210 is effectuated using computing resources provided by a computing device external to an electronic device effectuating computing setting 200. In one implementation, virtual image source 210 receives input via a network interface of an electronic device effectuating computing setting 200.

Image sensor 212 is configured to obtain content representing a view corresponding to a physical setting in which an electronic device effectuating computing device 200 is located ("physical content"). In one implementation, image sensor 212 is part of an array of image sensors configured to capture light field images corresponding to a physical setting in which an electronic device effectuating computing device 200 is located. In one implementation, image sensor 212 is disposed on an exterior surface of an electronic device effectuating computing device 200.

Input device 214 is configured to receive inputs representing requests to selectively transition from only presenting virtual content on display 230 to only presenting physical content in display 230. In one implementation, a mechanical resistance of input device 214 varies as an electronic device effectuating computing device 200 approaches a first state in which only virtual content is presented in display 230 and a second state in which only physical content is presented in display 230.

In one implementation, input device 214 is further configured to transition from only presenting the virtual content in display 230, to presenting a combination of the virtual content and physical content in display 230, to presenting only physical content in display 230 in a continuous manner based on continuous movement of input device 214. In one implementation, input device 214 is further configured to transition from only presenting the virtual content in display 230, to presenting a combination of the virtual content and physical content in display 230, to presenting only physical content in display 230 in discrete steps based on movement of input device 214 into a sequence of discrete positions. In one implementation, input device 214 is a rotatable device disposed on an exterior surface of an electronic device effectuating computing device 200.

In one implementation, input device 214 is further configured to transition from only presenting the virtual content in display 230, to presenting a combination of the virtual content and physical content in display 230, to presenting only physical content in display 230 at a linear rate of change. In one implementation, input device 214 is further configured to transition from only presenting the virtual content in display 230, to presenting a combination of the virtual content and physical content in display 230, to presenting only physical content in display 230 at a non-linear rate of change. In one implementation, input device 214 is further configured to transition from only presenting the virtual content in display 230, to presenting a combination of the virtual content and physical content in display 230, to presenting only physical content in display 230 as a function of distance to an electronic device effectuating computing setting 200.

Some implementations of the present invention describe input device 114 and/or input device 214 in terms of a human-to-machine interface ("HMI"). In these implementations, inputs representing requests to selectively transition between various levels of immersion presented by an electronic device effectuating computing setting 200 are described in terms of inputs, instructions, or commands originating from a user of the electronic device to obtain a desired output from the electronic device by virtue of input device 114 and/or input device 214 being described in terms of an HMI. However, implementations are not limited to such inputs originating from a user of an electronic device via an HMI.

For example, in some implementations, inputs representing requests to selectively transition between various levels of immersion presented by an electronic device effectuating computing setting 200 may originate from an event handler (or listener). The event handler is configured to generate such inputs in response to receiving an event notification from an event source. In one implementation, the event handler is effectuated using computing resources provided by an electronic device (e.g., device 110 of FIG. 1) effectuating computing setting 200. In one implementation, the event handler is effectuated using computing resources provided by a computing device external to an electronic device effectuating computing setting 200. In one implementation, the event handler receives event notifications via a network interface of an electronic device effectuating computing setting 200. In one implementation, an event handler is associated with a machine-to-machine interface ("M2M") or an API of an electronic device effectuating computing setting 200.

Event notifications are sent by an event source configured to monitor for an occurrence of a pre-defined event. In one implementation, an event source is a local event source effectuated using computing resources provided by an electronic device (e.g., device 110 of FIG. 1) effectuating computing setting 200. In one implementation, an event source is a remote event source effectuated using computing resources provided by a computing device external to an electronic device effectuating computing setting 200.

By way of example, a user of an electronic device effectuating computing setting 200 may be watching a movie in which a space traveler from Earth visits an alien planet. In this example, at some point, the movie reaches a scene in which the space traveler arrives on the alien planet. That point at which the movie reaches the scene in which the traveler arrives on the alien planet may define a pre-defined event. In one implementation, a pre-defined event is defined by media content reaching a particular scene.

An event source monitoring for an occurrence of that pre-defined event would send an event notification to an event handler. In response to receiving the event notification, the event handler would generate an input representing a request to selectively transition from a current level of immersion presented by the electronic device to another level of immersion. In this example, at the current level of immersion, physical content representing a coffee table of the user may be presented on display 230. In accordance with receiving the input, SR subsystem 220 may replace a portion of the physical content representing the coffee table with virtual content corresponding to the alien world, such as virtual content representing a fallen tree log of the alien world. In one implementation, SR subsystem 220 replacing a portion of physical content representing a physical object in the physical setting with virtual reality content associated with a particular scene of media content.

In this example, points at which the movie reaches other scenes may define other pre-defined events. The other pre-defined events include a second pre-defined event defined by another point at which the movie reaches a scene in which the traveler returns to Earth. The event source monitoring for an occurrence of that second pre-defined event would send another event notification to an event handler. In response to receiving that event notification, the event handler would generate an input representing a request to selectively transition to another level of immersion. In accordance with receiving that input, SR subsystem 220 may replace the virtual content representing the fallen tree log of the alien world with the physical content representing the coffee table.

In one implementation, selectively transitioning between levels of immersion in this example may involve gradually replacing physical content representing a physical setting proximate to the user with virtual content representing the alien world (or vice versa). In one implementation, gradually replacing physical content with virtual content (or vice versa) may be implemented using the "object-based" technique that is discussed in greater detail below.

As another example, a moving physical object (e.g., a person or animal) may enter a room in which a user of an electronic device effectuating computing setting 200 is fully immersed in a VR setting. That is, at a current level of immersion, only virtual content is presented on display 230 when the moving physical object enters the room. In this example, the moving physical object entering the room may define a pre-defined event. An event source monitoring for an occurrence of that pre-defined event would send an event notification to an event handler. In response to receiving that event notification, the event handler would generate an input representing a request to selectively transition from the current level of immersion to a different level of immersion.

In accordance with receiving the input, SR subsystem 220 may automatically transition to the different level of immersion by presenting a visual representation of the moving physical object entering the room on display 230. In one implementation, the visual representation of the moving physical object is an avatar of the moving physical object. In one implementation, the visual representation of the moving physical object is a wire frame representation. In one implementation, the moving physical object entering the room may be detected using an image sensor (e.g., image sensor 212) of the electronic device.

Continuing with this example, when the visual representation of the moving physical object is presented to the user, an eye tracking unit (e.g., eye tracking unit 1246 of FIG. 12) of the electronic device may determine an eye tracking characteristic of the user that indicates the user is looking at the visual representation. The user looking at a visual representation of the moving physical object may define a second pre-defined event. The event source monitoring for an occurrence of that second pre-defined event would send another event notification to the event handler.

In accordance with receiving that event notification, the event handler would generate an input representing a request to selectively transition to another level of immersion. In accordance with receiving that input, SR subsystem 220 may replace the visual representation of the moving physical object with the physical content depicting the moving physical object. In one implementation, the physical content depicting the moving physical object entering the room is obtained using an image sensor (e.g., image sensor 212) of the electronic device.

As another example, a user of an electronic device effectuating computing setting 200 may initially be motionless when fully immersed in a VR setting. That is, at a current level of immersion, only virtual content is presented on display 230 while the user is motionless. A sensor (e.g. an inertial measurement unit ("IMU") of the electronic device may then detect movement by the user. In this example, the user moving after being motionless when fully immersed in a VR setting may define a pre-defined event. An event source monitoring for an occurrence of that pre-defined event would send an event notification to an event handler. In one implementation, a change in a motion state of the user may be detected using an image sensor of the electronic device.

In accordance with receiving that event notification, the event handler would generate an input representing a request to selectively transition from the current level of immersion to a different level of immersion. In accordance with receiving the input, SR subsystem 220 may automatically transition to the different level of immersion by replacing virtual content within a threshold distance of the electronic device in display 230 with physical content representing a physical setting within the threshold distance. In one implementation, the physical content representing the physical setting within the threshold distance is obtained using an image sensor (e.g., image sensor 212) of the electronic device.

As another example, an electronic device effectuating computing setting 200 may detect movement by a physical object in a physical setting proximate to a user of the electronic device while the user is fully immersed in a VR setting. That is, at a current level of immersion, only virtual content is presented on display 230 when the movement is detected. In this example, the detection of movement by a physical object in a physical setting proximate to a user of the electronic device while the user is fully immersed in a VR setting may define a pre-defined event. An event source monitoring for an occurrence of that pre-defined event would send an event notification to an event handler. In response to receiving that event notification, the event handler would generate an input representing a request to selectively transition from the current level of immersion to a different level of immersion.

In accordance with receiving the input, SR subsystem 220 may automatically transition to the different level of immersion by presenting a visual representation of the physical object on display 230. In one implementation, the visual representation of the physical object is a virtual object. In one implementation, the visual representation of the physical object is a wire frame representation. In one implementation, the movement by the physical object may be detected using an image sensor (e.g., image sensor 212) of the electronic device.

In this example, the physical object moving within a threshold distance of the electronic device may define a second pre-defined event. The event source monitoring for an occurrence of that second pre-defined event would send another event notification to an event handler. In response to receiving that event notification, the event handler would generate an input representing a request to selectively transition to another level of immersion. In accordance with receiving that input, SR subsystem 220 may replace the visual representation of the physical object with physical content depicting the physical content. In one implementation, the physical content depicting the physical object is obtained using an image sensor (e.g., image sensor 212) of the electronic device.

SR subsystem 220 is configured to receive virtual content from virtual image source 210 and physical content from image sensor 212 at an input and generate SR content based on the virtual content and/or physical content for output to display 230. In one implementation, MR content is used to present an MR experience on display 230. In one implementation, SR subsystem 220 further receives data indicative of notifications or information pertaining to a physical setting and/or VR setting at the input for inclusion in the SR content output to display 230. Examples of such notification or information pertaining to a physical setting and/or a VR setting are discussed in greater detail below with respect to FIG. 6.

In one implementation, SR subsystem 220 includes an image processing function configured to modify attributes of visual content in order to manipulate, enhance, and/or transform the associated visual content for presentation on display 230. Example attributes of visual content include opacity, color parameters (e.g., hue, lightness, brightness, chroma, colorfulness, and saturation), contrast, texture, depth, and the like. In one implementation, modifying attributes of visual content involves applying a filter to the visual content being modified. In one implementation, the filter modifies the visual content uniformly. In one implementation, the filter modifies the visual content on a per-pixel basis.

In one implementation, SR subsystem 220 includes a composition process configured to receive visual content on an input and combine or merge the visual content to generate MR content for presentation on display 230. The composition process may be implementing using: node-based compositing of visual content, layer-based compositing of visual content, and the like. In one implementation, the composition process involves alpha blending virtual content with physical content. In one implementation, the MR content is formatted by SR subsystem 220 to be compatible with a display driver associated with display 230.

Display 230 includes an array of pixels 235 and is configured to present SR content output by SR subsystem 220. The SR content output by SR subsystem may include virtual content, physical content, or a combination thereof. Each pixel 235 may be implemented using light-emitting diodes (LEDs), organic light-emitting diodes (OLEDs), plasma cells, liquid crystal display (LCD) components, and the like. In one implementation, display 230 is further configured to visually distinguish between physical objects (e.g., physical object 120 of FIG. 1) in a physical setting of an electronic device and virtual objects (e.g., virtual object 130 of FIG. 1) in a virtual setting in response to detecting an interaction with input device 214. In one implementation, display 230 is disposed on an inward facing surface of an electronic device effectuating computing setting 200.

In one implementation, display 230 is a stereoscopic image display for presenting left-eye and right-eye view points. In one implementation, the stereoscopic image display presents a stereoscopic subset of a 3D representation of a scene corresponding to a physical setting (e.g., physical setting 105 of FIG. 1) in which an electronic device effectuating computing setting 200 is located. In one implementation, the 3D representation of the physical setting is reconstructed using light field images captured by an array of image sensors.

Figure 3:
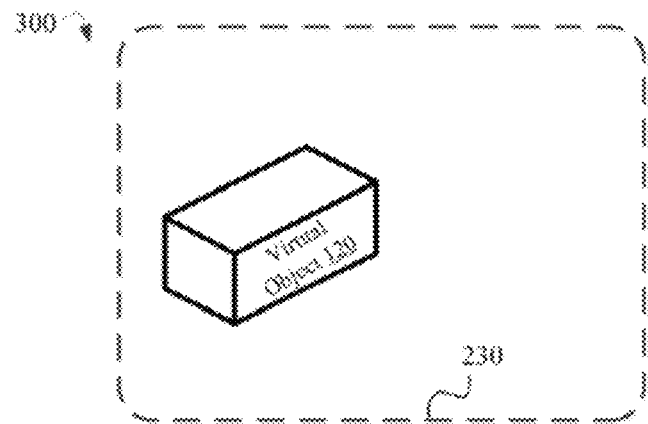
FIG. 3 illustrates an example of a display of an electronic device presenting first content representing a virtual reality setting.
Figure 4:
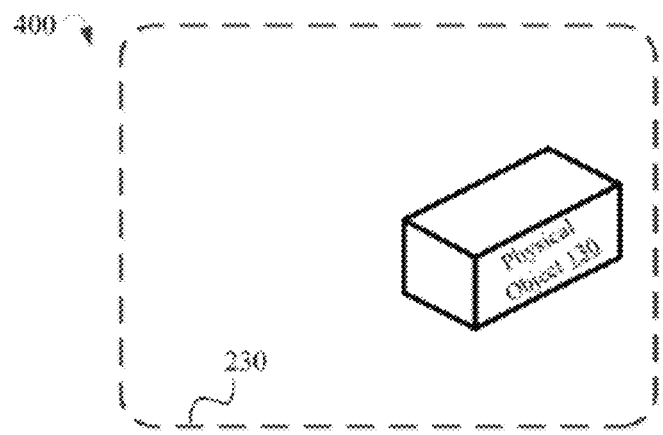
FIG. 4 illustrates an example of a display of an electronic device presenting second content corresponding to a physical setting in which the electronic device is located.
Figure 5:
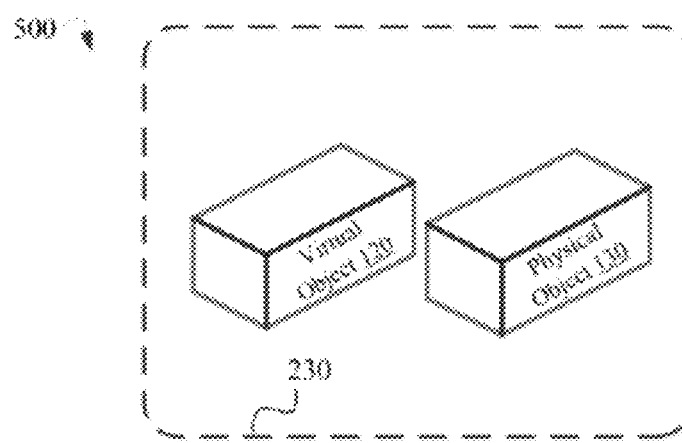
FIG. 5 illustrates an example of a display of an electronic device simultaneously presenting first content representing a virtual reality setting and second content corresponding to a physical setting in which the electronic device is located.

FIGS. 3-5 illustrate examples of content presented on display 230 of computing setting 200 of FIG. 2, as effectuated by device 110 of FIG. 1, in accordance with implementations. In the examples illustrated by FIGS. 3-5, the content presented is visual sensory content (either physical visual sensory content or virtual visual sensory content). However, one skilled in the art will recognize that implementations are not limited to visual sensory content. In various implementations, aspects are equally applicable to other forms of sensory content, such as auditory content, visual content, tactile content, olfactory content, gustatory content, or combinations thereof. Each of these different types of sensory content may be presented on an appropriate output device of an electronic device. For example, auditory content may be presented on a speaker of an electronic device and tactile content may be presented on a haptic output device of an electronic device.

FIG. 3 is an example of only presenting virtual content representing a VR setting on display 230. In FIG. 3, only virtual content representative of a virtual object in the VR setting is presented on display 230. Since only virtual content is presented in FIG. 3, physical content corresponding to a physical setting (e.g., physical setting 105 of FIG. 1) would not be presented on display 230. As such, physical content representative of a physical object (e.g., physical object 130) would not be presented on display 230 in the example of FIG. 3. This example of only presenting virtual content on display 230 may correspond to the first immersion level 710 discussed below in greater detail with reference to FIG. 7.

FIG. 4 is an example of only presenting physical content corresponding to a physical setting on display 230. In FIG. 4, only physical content representative of a physical object (e.g., physical object 130) in the physical setting is presented on display 230. Such physical content corresponding to the physical setting is obtained using an image sensor (e.g., image sensor 212 of FIG. 2). Since only physical content is presented in FIG. 4, virtual content representing a VR setting would not be presented on display 230. As such, virtual content representative of a virtual object (e.g., virtual object 120) would not be presented on display 230. This example of only presenting physical content on display 230 may correspond to the sixth immersion level 760 discussed below in greater detail with reference to FIG. 7.

FIG. 5 is an example of simultaneously presenting virtual content representing a VR setting and physical content corresponding to a physical setting on display 230. In FIG. 5, the physical content corresponding to the physical setting is obtained using an image sensor (e.g., image sensor 212 of FIG. 2). In one implementation, the virtual content representing the VR setting and the physical content corresponding to the physical setting is simultaneously presented on display 230 by overlaying separate layers corresponding to each respective content, as illustrated by FIG. 6. Since visual content corresponding to both the VR setting and the physical setting is presented on display 230 in FIG. 5, visual content representative of both a virtual object (e.g., virtual object 120) and a physical object (e.g., physical object 130) is presented on display 230 in this example. This example of presenting visual content corresponding to both the VR setting and the physical setting on display 230 may correspond to one or more immersion levels among the second immersion level 720 through the fifth immersion level 750 discussed below in greater detail with reference to FIG. 7.

Figure 6A:
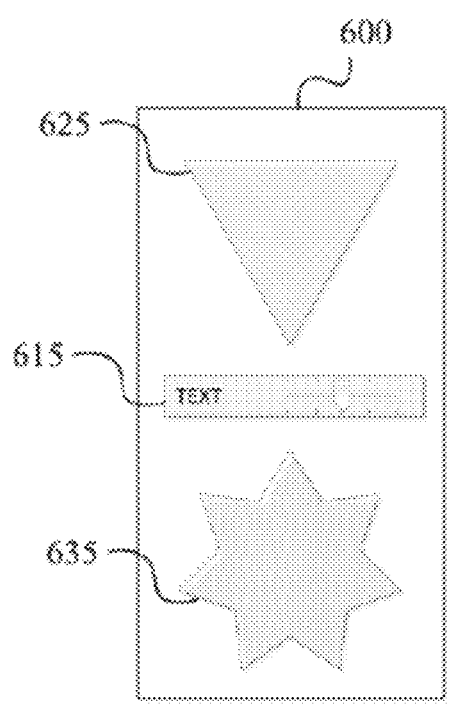
FIG. 6A illustrates an example of a display of an electronic device that is suitable for implementing aspects of the present disclosure.
Figure 6B:
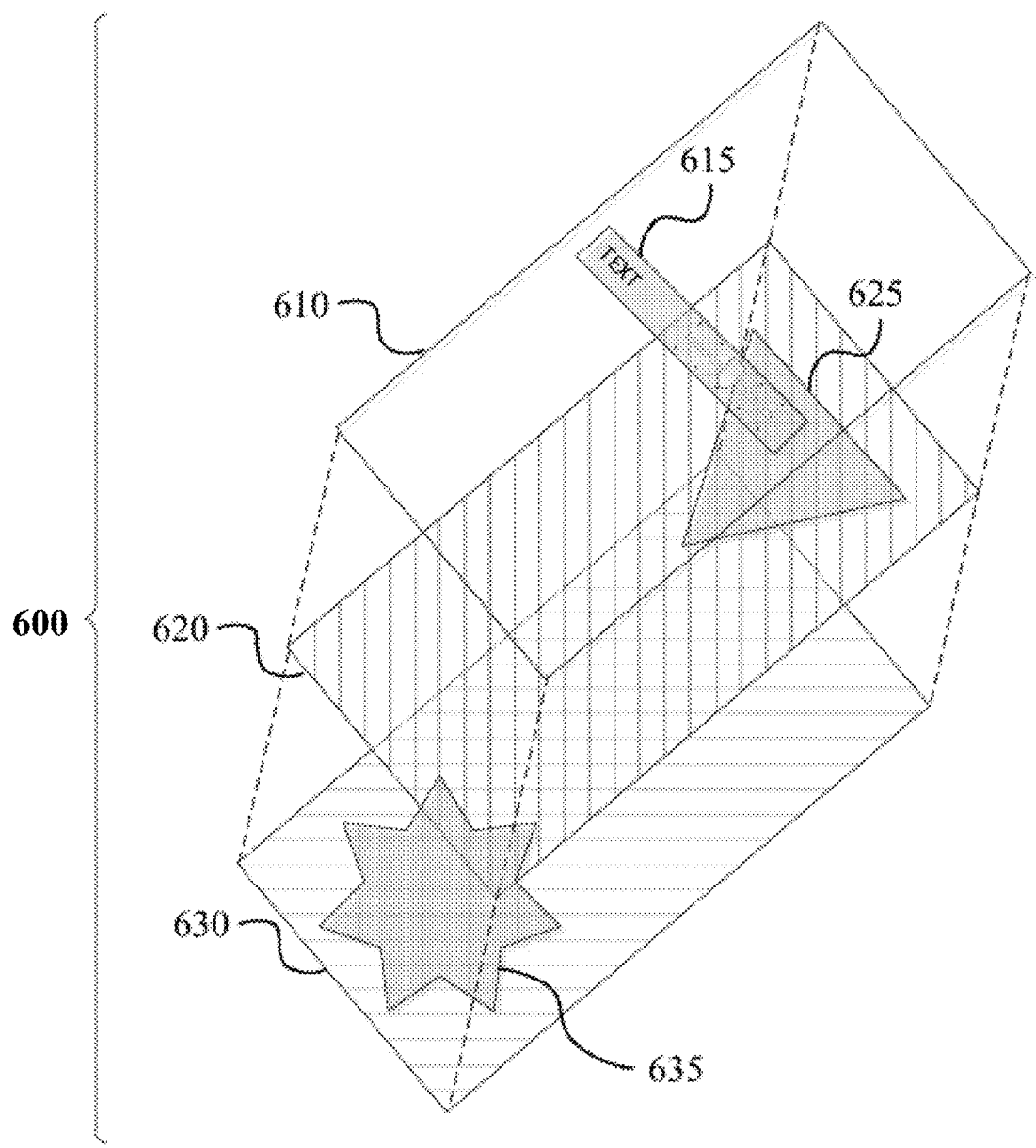
FIG. 6B is an exploded view of the example display of FIG. 6A that illustrates a plurality of layers comprising that display.

FIGS. 6A-6B illustrate an example of a display 600 that is suitable for implementing aspects of the present invention. In one implementation, display 230 of FIG. 2 is implemented using display 600. FIG. 6A is a composed view of display 600 and FIG. 6B is an exploded view of display 600. Generally, display 600 is configured to present visual content, which in the example of FIGS. 6A-6B is represented by visual element 615, visual element 625, and visual element 635. In the composed view of display 600 depicted in FIG. 6A, visual element 615, visual element 625, and visual element 635 appear to each be components of the same visual content that is presented on display 600. However, as seen in the exploded view of display 600 provided by FIG. 6B, each visual element resides on a separate layer of visual content among a plurality of layers of visual content that are presented simultaneously on display 600. While FIG. 6B depicts display 600 as comprising three layers of visual content (i.e., layers 610, 620, and 630), one skilled in the art will recognize that display 600 may include any number of layers.

The composed view of display 600 shown in FIG. 6A is a result of a composition process performed by an SR subsystem (e.g., SR subsystem 220 of FIG. 2). Specifically, the composition process of the SR subsystem receives each layer of visual content shown in FIG. 6B (i.e., first layer 610, second layer 620, and/or third layer 630) composing display 600 as an input and creates the composed view of display 600 shown in FIG. 6A. In one implementation, the composition process of the SR subsystem includes alpha blending visual content of the plurality of layers of visual content.

By virtue of residing on separate layers of visual content, visual element 615, visual element 625, and visual element 635 are each components of different visual content. Specifically, visual element 615 is a component of visual content presented on first layer 610, visual element 625 is a component of visual content presented on second layer 620, and visual element 635 is a component of visual content presented on third layer 630. This isolation provided by presenting the different visual content on separate layers of visual content facilitates independently modifying attributes of visual content presented on each respective layer of visual content. In one implementation, the independent modification of attributes of visual content is implemented through an image processing function, such as the image processing function performed by an SR subsystem (e.g., SR subsystem 220 of FIG. 2) on each layer of visual content in generating SR content to present on display 600.

For example, an opacity associated with visual element 615 included among the visual content presented on first layer 610 may be modified independently from an opacity associated with visual element 625 included among the visual content presented on second layer 620. Likewise, an opacity associated with visual element 635 included among the visual content presented on third layer 630 may be modified independently of the respective opacity of visual element 615 and visual element 625. In one implementation, an opacity of content occurs within a pre-defined period of time that is perceivable by a user. One skilled in the art will recognize that opacity is one of many attributes that characterize visual content. Each of these attributes may be independently modified to manipulate, enhance, and/or transform the associated visual content. Examples of such attributes relate to color parameters (e.g., hue, lightness, brightness, chroma, colorfulness, and saturation), contrast, texture, depth, and the like.

The isolation provided by presenting the different visual content on separate layers of visual content further facilitates simultaneously presenting visual content obtained using different sources of visual content. By overlaying visual content obtained using a first source of visual content with visual content obtained using a second source of visual content, a computing setting (e.g., computing setting 200 of FIG. 2) may simultaneously present content from each source of visual content on a display (e.g., display 230).

For example, the visual content presented on second layer 620 may be obtained using an image sensor (e.g., image sensor 212) whereas the visual content presented on third layer 630 may be obtained using a virtual image source (e.g., virtual image source 210). In this example, visual element 625 may correspond to a visual representation of a physical object (e.g., physical object 130 of FIG. 1) and visual element 635 may correspond to a visual representation of a virtual object (e.g. virtual object 120). As another example, the visual content presented on second layer 620 may be obtained using a virtual image source whereas the visual content presented on third layer 630 may be obtained using an image sensor. In this example, visual element 625 may correspond to a visual representation of a virtual object and visual element 635 may correspond to a visual representation of a physical object.

In FIGS. 6A and 6B, visual element 635 is depicted as comprising text and a software interface element. A computing setting may use a layer of visual content, such as layer 630, to present any notifications or information pertaining to a physical setting and/or VR setting. For example, the computing setting may populate visual element 635 with information relating to: a current heading direction, a current position in the physical setting and/or VR setting, distance between a current location and a waypoint/destination location in the physical setting and/or VR setting, and the like. As another example, the computing setting may populate visual element 635 with descriptive and/or contextual information corresponding to the physical setting and/or VR setting (e.g., an identity of a physical/virtual object, current weather in the physical setting and/or VR setting, and the like). As another example, the computing setting may populate visual element 635 with an indication of a relative composition of displayed visual content.

In some implementations, an input device is used to transition between levels of immersion that are associated with different reality boundary locations. Some implementations, involve a method that presents, on the display, an SR environment at a first immersion level that is associated with a first location of a reality boundary. The method further involves receiving, using an input device, input representing a request to change the first immersion level to a second immersion level. The input may change the location of the reality boundary from the first location to a second location. In accordance with receiving the input, the method presents the SR environment at the second immersion level. The second immersion level is associated with the second location of the reality boundary and wherein real content of a physical setting and virtual content are presented in the SR environment based on the location of the reality boundary.

The second immersion level may display more real content and less virtual content than the first immersion level or the second immersion level may display less real content and more virtual content than the first immersion level. In some implementations, virtual content is only presented on one side of the reality boundary. In some implementations, real content is only presented on one side of the reality boundary.

In some implementations, the reality boundary is a circular boundary defined by a distance away from a viewpoint position. The distance of the circular boundary from the viewpoint position may differ between the first location and second location of the reality boundary, e.g., the reality boundary may move radially outward or radially inward as the user switches between two or more immersion levels.

Figure 7:
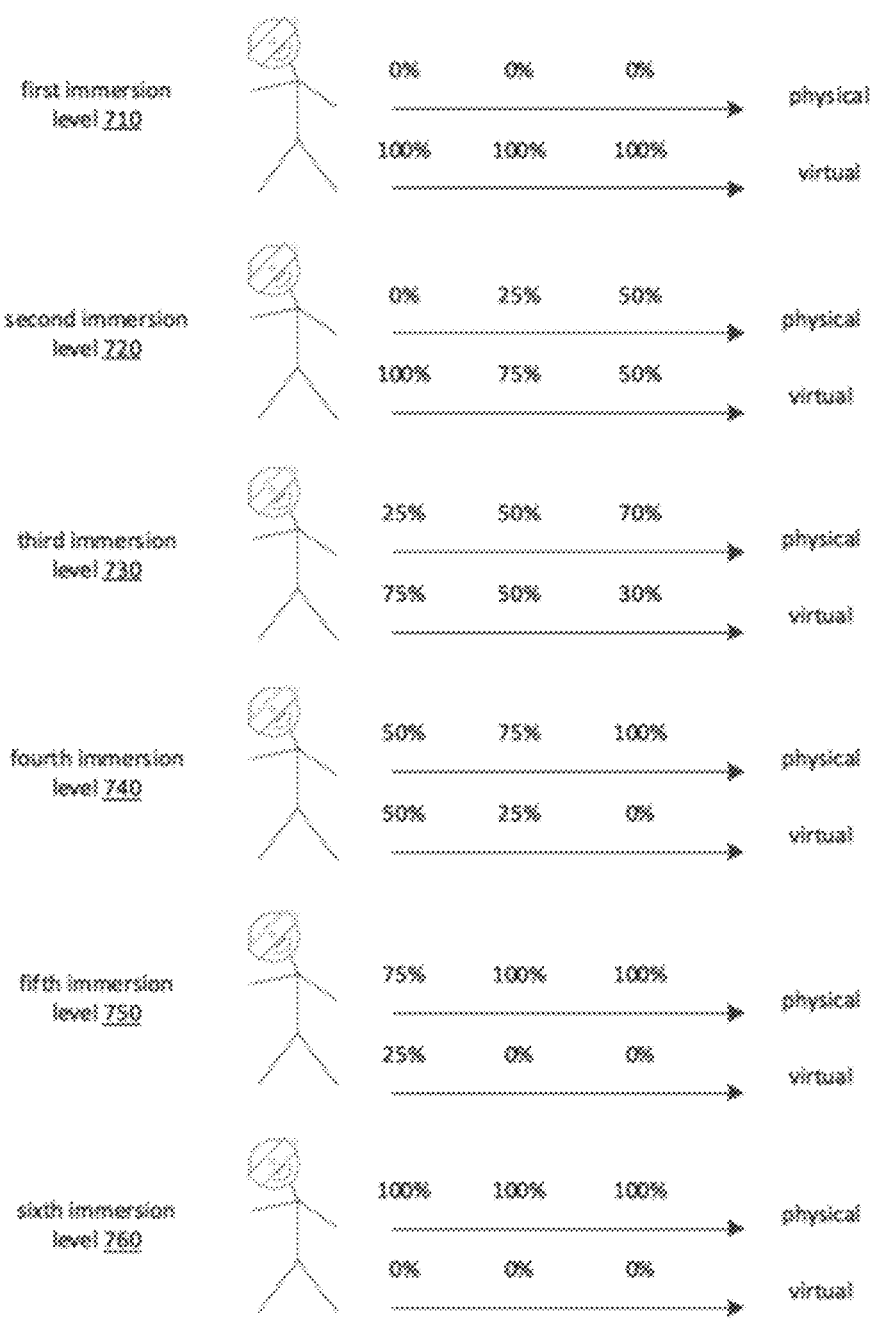
FIG. 7 illustrates an example of selectively transitioning between levels of immersion with an electronic device, as a function of distance from the electronic device.

FIG. 7 illustrates an example of selectively transitioning between levels of immersion with an electronic device, as a function of distance from the electronic device. This produces an effect in which, as immersion level changes, there are transitions of content from virtual to physical and vice versa based on the contents distance away and based on how virtual/physical that distance is in current immersion level. For example, at a first level of immersion, all distances from the user may correspond to the virtual environment, at a second level of immersion, the area close by may be completely virtual, but as the distance increases away from the user, the virtual content fades out while the physical content fades in. As the user changes to higher (numbered) levels of immersion, the area near the user becomes less virtual and more physical, e.g., the boundary at which the virtual/physical transition begins changes. The example of FIG. 7 includes six levels of immersion that range from a first immersion level 710 in which only virtual content is presented on a display of an electronic device to a sixth immersion level 760 in which only physical content is presented on the display. In FIG. 7, a distance from the electronic device in the physical setting and a distance from the electronic device in the VR setting are each represented by an arrow extending away from the electronic device.

Each arrow corresponds to a distance from a viewpoint position of the electronic device extending in a radially outward direction from the viewpoint position in the respective setting. As explained in greater detail below with reference to FIGS. 8 and 9, a viewpoint position defines a position of an electronic device that is common to both a physical setting and a VR setting. In that respect, each arrow in FIG. 7 is analogous to reference designator 820 of FIGS. 8 and 9. Moreover, for each immersion level depicted in FIG. 7, a corresponding electronic device approximates viewpoint position 810 of FIGS. 8 and 9.

As illustrated by FIG. 7, an SR experience provided by an electronic device (e.g., device 110 of FIG. 1) may involve various levels of immersion. At a first immersion level 710, only virtual content is presented on a display of the electronic device. FIG. 7 illustrates this by showing that the display is composed of 100% virtual content regardless of distance from the viewpoint position of the electronic device at the first immersion level 710. Conversely, at the first immersion level 710, the display is composed of 0% physical content.

At a second immersion level 720, the relative composition of content remains 100% virtual content/0% physical content at a first distance proximate to the viewpoint position. In other words, virtual content that is located at the first distance proximate to the viewpoint position is displayed at 100%, while physical content that is located at the first distance proximate to the viewpoint position is displayed at 0%. However, as distance increases in the radially outward direction from the viewpoint position the relative composition of the content changes. For example, at a second distance that is further from the viewpoint position than the first distance, the relative composition of the content at the second immersion level 720 changes to 75% virtual content/25% physical content. In other words, virtual content that is located at the second distance proximate to the viewpoint position is displayed at 75%, while physical content that is located at the second distance proximate to the viewpoint position is displayed at 25%. At a third distance that is further from the viewpoint position than the second distance, the relative composition of the content at the second immersion level 720 changes again to 50% virtual content/50% physical content. In other words, virtual content that is located at the third distance proximate to the viewpoint position is displayed at 50%, while physical content that is located at the third distance proximate to the viewpoint position is displayed at 50%. If the first, second, and third distances are presumed to be equidistant from each other in this example, the relative composition of the content at the second immersion level 720 may be viewed as transitioning at a linear rate of change with respect to the viewpoint position. For example, from one distance to the next (e.g., from the first distance to the second distance), the relative composition of virtual content decreases by 25% whereas the relative composition of physical content increases by 25%.

However, the relative composition of the content may also have a non-linear rate of change with respect to the viewpoint position, as illustrated by the third immersion level 730. For example, between the first distance and the second distance, the relative composition of virtual content decreases by 25% (i.e., from 75% to 50%) whereas the relative composition of physical content increases by 25% (i.e., from 25% to 50%). Yet, between the second distance and the third distance, the relative composition of virtual content decreases by 20% (i.e., from 50% to 30%) whereas the relative composition of physical content increases by 20% (i.e., from 50% to 70%).

Although not illustrated in the example of FIG. 7, an electronic device could similarly be configured to transition from only presenting virtual content with the display, to presenting the combination of the virtual content and the physical content with the display, to only presenting the physical content with the display at a linear rate of change. Stated differently, the electronic device could transition from an immersion level that is similar to the first immersion level 710 to another immersion level that is similar to the sixth immersion level 760 via an intervening immersion level at a linear rate of change. Likewise, an electronic device could be configured to transition from only presenting virtual content with the display, to presenting the combination of the virtual content and the physical content with the display, to only presenting the physical content with the display at a non-linear rate of change.

At the fourth immersion level 740, with respect to content corresponding to the third distance from the viewpoint position, only physical content corresponding to the third distance from the viewpoint position is displayed—no virtual content corresponding to the third distance from the viewpoint position is displayed. In contrast, with respect to content corresponding to the second distance from the viewpoint position, some physical content corresponding to the second distance from the viewpoint position is displayed (e.g., 75%) and some virtual content corresponding to the second distance from the viewpoint position is displayed (e.g., 25%). With respect to content corresponding to the first distance from the viewpoint position, some physical content corresponding to the second distance from the viewpoint position is displayed (e.g., 50%) and some virtual content corresponding to the second distance from the viewpoint position is displayed (e.g., 50%).

At the fifth immersion level 750, with respect to content corresponding to the second and third distances from the viewpoint position, only physical content is displayed—no virtual content is displayed. Thus, only physical content is presented for more distances from the viewpoint than in the fourth immersion level 740. At the sixth immersion level 750, with respect to content corresponding to the first, second, and third distances from the viewpoint position, only physical content is displayed—no virtual content is displayed. Thus, FIG. 7 illustrates presenting physical content from gradually closer areas as the immersion level increases from the first immersion level 710 to the sixth immersion level 760. Note that the transition between the fourth immersion level 740 and the fifth immersion level 750 introduces the concept of a reality boundary that is explained in greater detail below with reference to FIGS. 8 and 9.

Figure 8:
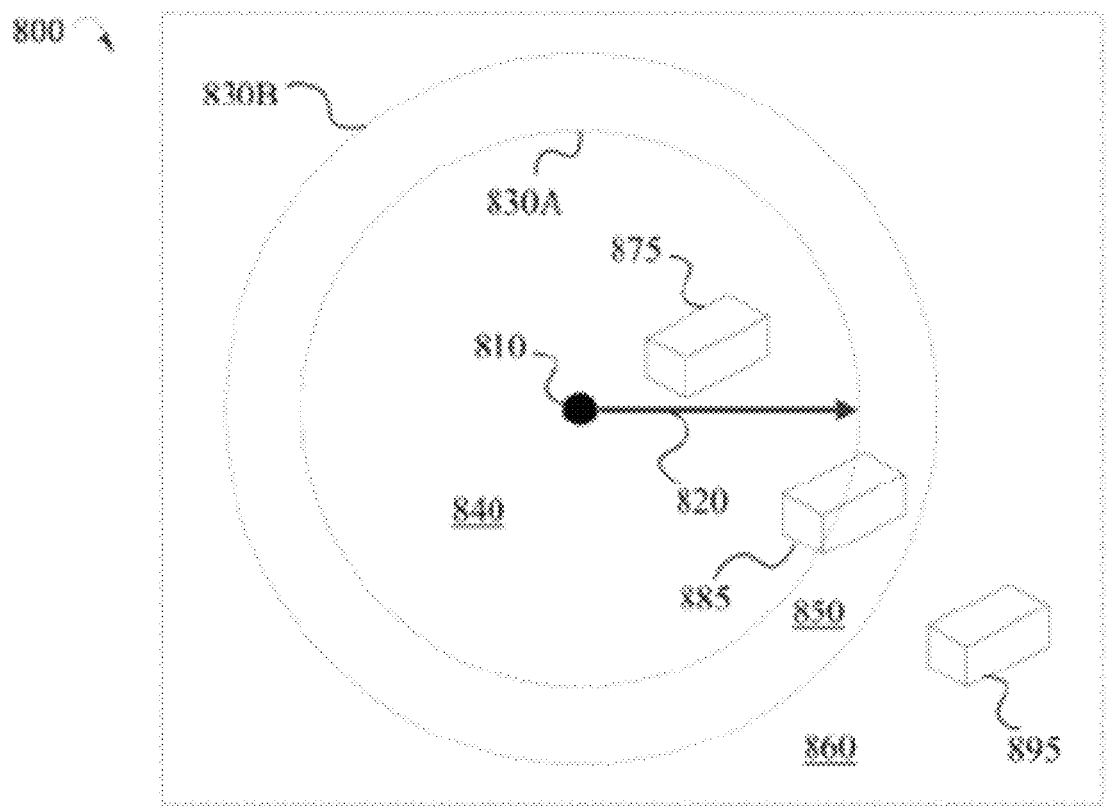
FIG. 8 illustrates a top-down view of a simulated reality experience, in accordance with some implementations.
Figure 9:
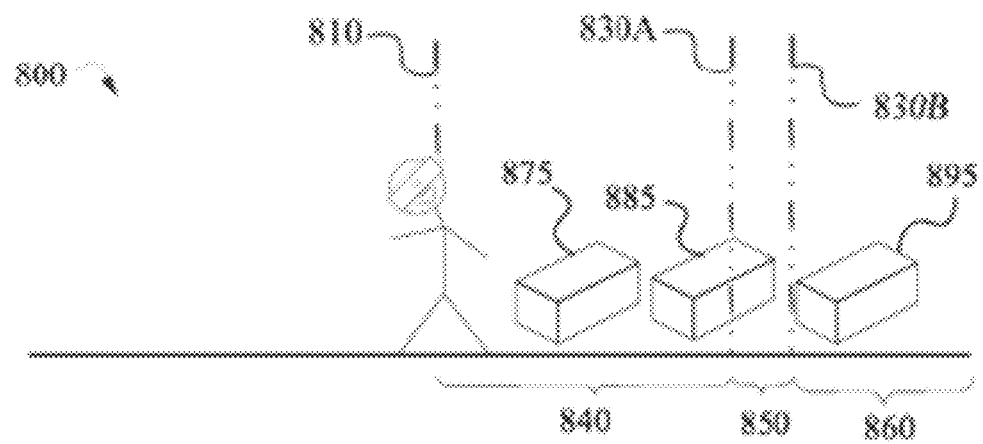
FIG. 9 illustrates a side view of the simulated reality experience illustrated in FIG. 8.
Figure 10A:
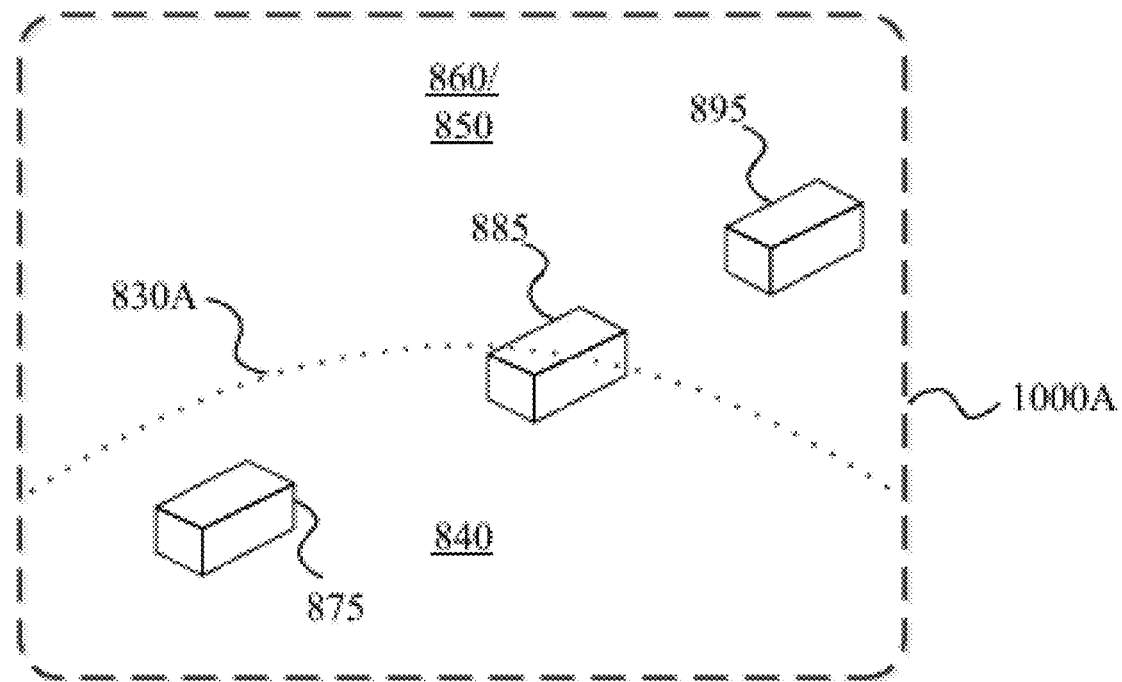
FIG. 10A illustrates an example of a display of an electronic device presenting the simulated reality experience illustrated in FIGS. 8 and 9 at a first immersion level.
Figure 10B:
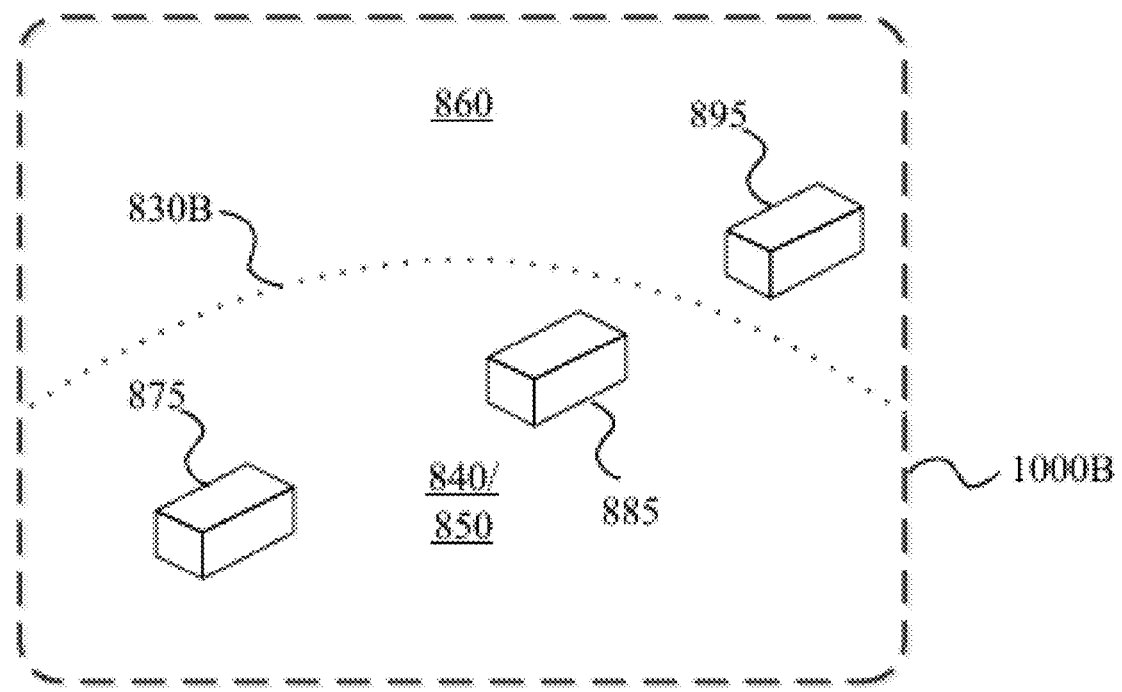
FIG. 10B illustrates an example of a display of an electronic device presenting the simulated reality experience illustrated in FIGS. 8 and 9 at a second immersion level.

FIGS. 8-10B illustrate an example of a SR experience 800 presented on a display 1000 an electronic device (e.g., device 110 of FIG. 1). FIG. 8 illustrates a top-down view of the SR experience 800 and FIG. 9 illustrates a side view of the SR experience 800. FIG. 10A illustrates an example of the display 1000 of the electronic device that presents the SR experience 800 at a first immersion level from a perspective of viewpoint position 810 (1000A). FIG. 10B illustrates an example of the display 1000 that presents the SR experience 800 at a second immersion level from a perspective of viewpoint position 810 (1000B).

In presenting the SR experience 800, a viewpoint position 810 defines a position of the electronic device that is common to both a physical setting and a VR setting. As the SR experience 800 is presented on the display 1000 of the electronic device, the viewpoint position 810 may change over time as the electronic device moves. For example, assuming that viewpoint position 810 is an initial position of the electronic device before moving, after the electronic device moves an updated viewpoint position may be located between object 875 and object 885. Upon moving to that updated viewpoint position, display 1000 would be updated to present the SR experience from a perspective of that updated viewpoint position. However, for the sake of simplicity, the following description of FIGS. 8 and 9 will assume that the electronic device remains stationary at viewpoint position 810.

As discussed above with reference to FIG. 7, an SR experience provided by an electronic device, such as SR experience 800, may involve various levels of immersion. Those various levels of immersion may range from only presenting virtual content on a display of the electronic device (e.g., first immersion level 710), to presenting a combination of virtual content and physical content on the display (e.g., second immersion level 720 through fifth immersion level 750), to only presenting physical content on the display (e.g., sixth immersion level 760).

In the example illustrated by FIGS. 8-10B, a reality boundary 830 is introduced when presenting a combination of virtual content and physical content on display 1000. The reality boundary delineates between a first region of the virtual/physical settings and a second region of the virtual/physical settings. In the first region, the displayed virtual content predominates the displayed physical content ("virtual predominant region"). For example, a relative composition of the first region may be 51% virtual content (or greater)/49% physical content (or less). In the second region, the displayed physical content predominates the displayed virtual content ("physical predominant region"). For example, a relative composition of the second region of display 1000 may be 49% virtual content (or less)/51% physical content (or greater).

As the electronic device transitions between levels of immersion that involve presenting a combination of virtual content and physical content on display 1000, the reality boundary 830 may be located in different positions. For example, a comparison between FIGS. 10A and 10B that present the SR experience 800 at the first and second immersion levels, respectively, shows that a position of the reality boundary changes from reality boundary 830A to reality boundary 830B as a level of immersion changes.

In display 1000A (presenting the first immersion level), a region extending between viewpoint position 810 and the reality boundary 830A encompasses portion 840 of the SR experience 800. Yet, in display 1000B (presenting the second immersion level), the region extending between viewpoint position 810 and the reality boundary 830B encompasses both portion 840 and portion 850 of the SR experience 800. Thus, in transitioning between the first and second immersion levels (presented by display 1000A and display 1000B, respectively), the reality boundary 830 transitioned in a radially outward direction 820. Specifically, the reality boundary 830 transitioned in the radially outward direction 820 between a first position (represented by reality boundary 830A) and a second position (represented by reality boundary 830B). The first position being more proximate to the viewpoint position 810 than the second position.

Object 875 and object 895 are on opposing sides of the reality boundary 830 regardless of whether the reality boundary 830 is positioned at the first position (i.e., reality boundary 830A) while presenting the first immersion level or at the second position (i.e., reality boundary 830B) while presenting the second immersion level. Object 875 is in the region extending between viewpoint position 810 and the reality boundary 830. Object 895 is in a region extending beyond the reality boundary 830 in the radially outward direction 820. As such, at both immersion levels, the display of object 875 and object 895 does not change.

In contrast, the display of object 885 depends upon the immersion level. As the immersion level changes and the reality boundary 830 changes from reality boundary 830A to reality boundary 830B and vice versa, the display of object 885 changes since at least a portion of the object 885 changes from being within the reality boundary 830 to outside the reality boundary 830 or vice versa.

For example, a first region extending between viewpoint position 810 and the reality boundary 830 may be a virtual predominant region while a second region extending beyond the reality boundary 830 may be a physical predominant region. In this example, the portion of object 885 in the physical predominant region while presenting at the first immersion level would be in the virtual predominant region upon transitioning from the first immersion level to the second immersion level.

As another example, a first region extending between viewpoint position 810 and the reality boundary 830 may be a physical predominant region while a second region extending beyond the reality boundary 830 may be a virtual predominant region. In this example, the portion of object 885 in the virtual predominant region while presenting at the first immersion level would be in the physical predominant region upon transitioning from the first immersion level to the second immersion level.

In the example illustrated by FIGS. 8-10B, virtual objects in a VR setting are mapped to (aligned with) physical objects in a physical setting in which an electronic device is located. However, implementations are not so limited. In one implementation, virtual objects in a VR setting are positioned without regard to physical objects in a physical setting. Stated differently, in one implementation, virtual objects in the VR setting are not mapped to (aligned with) physical objects in the physical setting. In one implementation, distances in a VR setting vary at a different scale than distances in a physical setting. Stated differently, in one implementation, distances in a VR setting do not have a one-to-one correspondence with distances in a physical setting.

Moreover, in some implementations, a visual representation of a physical object may be presented in a display of an electronic device without reference to a reality boundary. In one implementation, a visual representation a physical object is presented on a display of an electronic device in response to detecting the physical object within a threshold distance of the electronic device. In one implementation, a physical object is detected as being within a threshold distance of an electronic device using an image sensor (e.g., using an RGB-D camera, an infrared sensor, a depth sensor, etc.). In one implementation, the visual representation of the physical object is a wire frame representation of the physical object. In one implementation, the wire frame representation represents peripheral boundaries of the physical object. In one implementation, the visual representation is an image of the physical object obtained using an image sensor.

In some implementations, an SR experience provided by an electronic device (e.g., device 110 of FIG. 1) may involve various levels that each correspond to a different category of physical objects. Various benefits that may be realized through this "object-based" technique for selectively transitioning between levels of immersion with an electronic device. One such benefit is that physical content corresponding to physical objects of a physical setting and virtual content of a virtual reality setting that replaces the physical content on a display of the electronic device may serve as points of reference in a user's field of view that are common to the physical setting and the virtual reality setting. By providing common points of reference in a user's field of view when transitioning between the physical and virtual reality setting, an incidence of motion sickness experienced by users of the electronic device.

By way of example, this "object-based" technique may involve 10 levels of immersion when transitioning between only presenting physical content on a display to only presenting virtual content on the display (or vice versa). In this example, the electronic device may selectively transition between these 8 levels of immersion in accordance with receiving an input using an input device of the electronic device.

At a first immersion level of this example, only physical content is presented on the display of the electronic device. At a second immersion level of this example, physical content corresponding to other people is replaced with virtual content on the display. At a third immersion level of this example, physical content corresponding to pets and other animals is replaced with virtual content on the display. At a fourth immersion level of this example, physical content corresponding to physical content corresponded to flooring of the physical setting is replaced with virtual content on the display. At a fifth immersion level of this example, physical content corresponding to furniture of the physical setting is replaced with virtual content on the display.

At a sixth immersion level of this example, physical content corresponding to windows of the physical setting is replaced with virtual content on the display. At a seventh immersion level of this example, physical content corresponding to doorjambs, base boards, and other molding or trim work is replaced with virtual content on the display. At an eighth immersion level of this example, physical content corresponding to walls of the physical setting and associated wall hangings (e.g., mirrors, photographs, paintings, etc.) is replaced with virtual content on the display. At a ninth immersion level of this example, physical content corresponding to ceilings of the physical setting is replaced with virtual content on the display. At a tenth immersion level of this example, any residual physical content is replaced with virtual content such that only virtual content is presented on the display of the electronic device.

One skilled in the art will appreciate that the number of levels of immersion, an order of the levels, object categories assigned to each level of immersion, and the like may vary as a matter of design choice. For example, in some implementations an electronic device may be configured to selectively transition between 9 or fewer levels of immersion whereas in other implementations may involve 11 or more levels of immersion. As another example, in some implementations physical content corresponding to ceilings of a physical setting may be replaced with virtual content at an immersion level intervening between immersion levels assigned to furniture and windows of the physical setting.

As another example, in some implementations physical content corresponding to flooring and furniture of a physical setting may be replaced with virtual content on the display at the same immersion level. As another example, in some implementations object categories may be assigned to immersion levels at a coarser or finer granularity. In this example, a coarser granularity may involve combining the flooring, walls, and ceiling object categories discussed above with an object category corresponding to physical boundaries defining the physical setting. In this example, a finer granularity may involve separating the furniture object category discussed above into multiple object categories (e.g., separate object categories for seats, tables, drawers, and the like).

Figure 11:
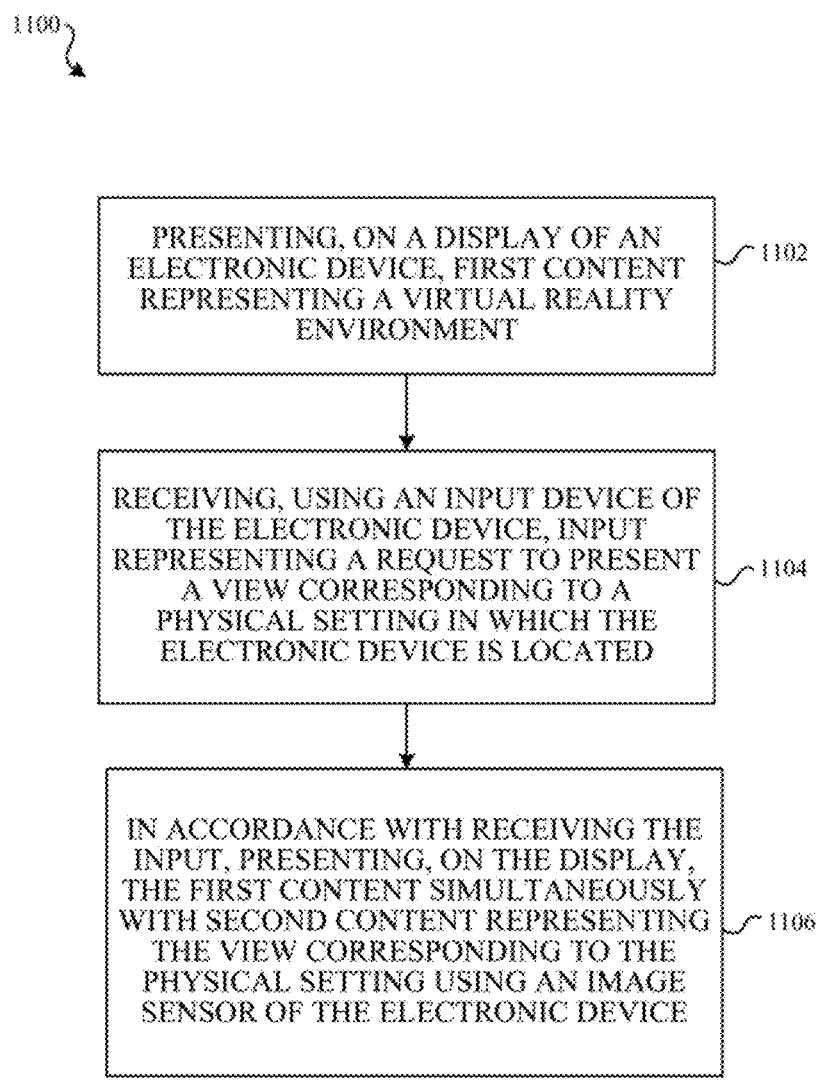
FIG. 11 is a flow-chart illustrating an example of a method for selectively transitioning between levels of simulated reality immersion.

Referring to FIG. 11, an example method 1100 for selectively transitioning between levels of immersion is illustrated. In one implementation, method 1100 is effectuated by device 110 of FIG. 1 or computing setting 200 of FIG. 2. At block 1102, method 1100 includes presenting, on a display of an electronic device, first content representing a VR setting. In one implementation, the first content is output by virtual image source 210 of FIG. 2.

At block 1104, method 1100 includes receiving, using an input device of the electronic device, input representing a request to present a view corresponding to a physical setting in which the electronic device is located. In one implementation, prior to receiving the input representing the request to present the view corresponding to the physical setting in which the electronic device is located, only virtual content is presented on the display. In one implementation, only presenting virtual content on the display corresponds to the first immersion level 710 of FIG. 7.

In one implementation, the input device is configured to transition from only presenting the first content in the display, to presenting a combination of the first content and the second content in the display, to presenting only the second content in the display based on continuous movement of the input device. In one implementation, the input device is configured to transition from only presenting the first content in the display, to presenting a combination of the first content and the second content in the display, to presenting only the second content in the display based on movement of the input device into a sequence of discrete positions. In one implementation, a mechanical resistance of the input varies as the electronic device approaches a first state in which only the first content is presented in the display and a second state in which only the second content is presented in the display.

At block 1106, in accordance with receiving the input, method 1100 includes presenting on the display the first content simultaneously with second content representing the view corresponding to the physical setting obtained using an image sensor of the electronic device. In one implementation, the second content is output by sensor 112 of FIG. 1 or image sensor 212 of FIG. 2. In one implementation, the second content is a video of the physical setting comprising a sequence of images of the physical setting. In one implementation, presenting the first content simultaneously with the second content comprises overlaying the first content with the second content obtained using the image sensor. In one implementation, presenting the first content simultaneously with the second content comprises overlaying the second content obtained using the image sensor with the first content.

In one implementation, presenting the first content simultaneously with the second content comprises modifying an opacity of the displayed first content representing the VR setting. In one implementation, presenting the first content simultaneously with the second content comprises modifying an opacity of the displayed second content representing the view corresponding to the physical setting. In one implementation, presenting the first content simultaneously with the second content comprises presenting a plurality of levels of immersion by modifying an opacity of the displayed first content, modifying an opacity of the displayed second content, or a combination thereof.

In one implementation, the input representing the request to present the view corresponding to the physical setting in which the electronic device is located is a first input. In one implementation, method 1100 further includes receiving, using the input device, a second input representing a request to stop displaying the displayed first content representing the VR setting. In one implementation, in accordance with receiving the second input, method 1100 further includes removing the first content from the display and continuing to present the second content representing the view corresponding to the physical setting obtained using the image sensor of the electronic device. In one implementation, method 1100 further includes alpha blending the second content with the first content.

In one implementation, removing the first content from the display and continuing to present the second content representing the view corresponding to the physical setting corresponds to the sixth immersion level 760 of FIG. 7.

In one implementation, the input device is rotatable in at least two directions. In one implementation, the first input and the second input are rotations in different directions of the at least two directions. In one implementation, the first input and the second input are rotations in the same direction of the at least two directions.

In one implementation, method 1100 is performed by processing logic, including hardware, firmware, software, or a combination thereof. In one implementation, method 1100 is performed by a processor executing code stored in a non-transitory computer-readable medium (e.g., a memory).

Figure 12:
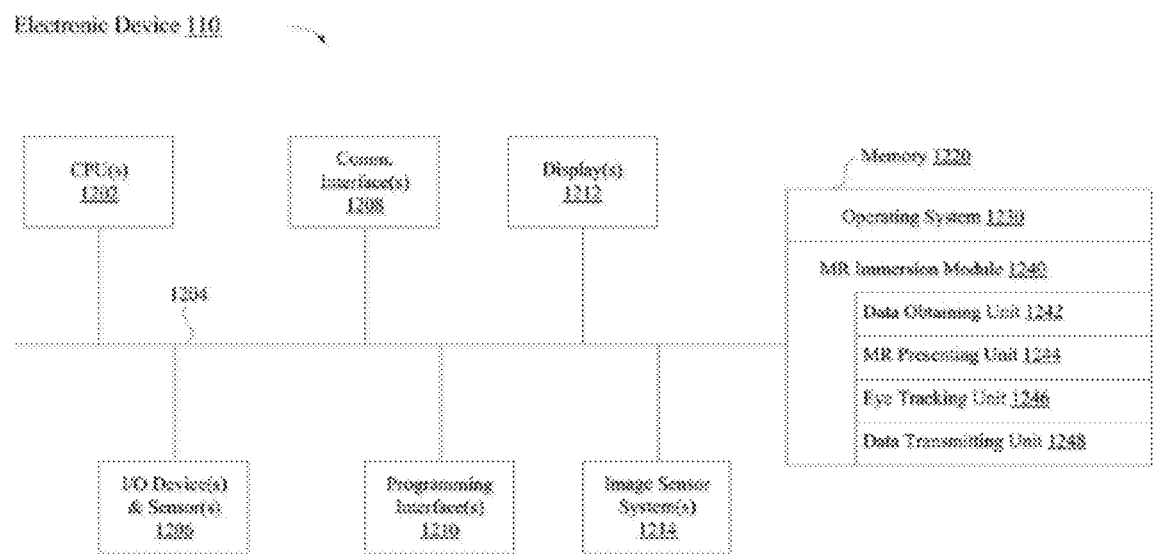
FIG. 12 is a block diagram of an example electronic device, in accordance with some implementations.

FIG. 12 is a block diagram of an example device 110, in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations device 110 includes one or more processing units 1202 (e.g., microprocessors, ASICs, FPGAs, GPUs, CPUs, processing cores, and/or the like), one or more I/O devices and sensors 1206, one or more communication interfaces 1208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1210, one or more displays 1212, one or more interior and/or exterior facing image sensor systems 1214, a memory 1220, and one or more communication buses 1204 for interconnecting these and various other components.

In some implementations, the one or more communication buses 1204 include circuitry that interconnects and controls communications between system components. In some implementations, the one or more I/O devices and sensors 1206 include at least one of an IMU, an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1212 are configured to present the MR experience to the user. In some implementations, the one or more displays 1212 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro- mechanical system ("MEMS"), and/or the like display types. In some implementations, the one or more displays 1212 correspond to diffractive, reflective, polarized, holographic, etc. waveguide displays. For example, device 110 includes a single display. In another example, device 110 includes a display for each eye of the user. In some implementations, the one or more 1212 are capable of presenting any combination of physical content and virtual content.

In some implementations, the one or more image sensor systems 1214 are configured to obtain image data that corresponds to at least a portion of the face of the user that includes the eyes of the user. For example, the one or more image sensor systems 1214 include one or more RGB camera (e.g., with a complimentary metal-oxide-semiconductor ("CMOS") image sensor or a charge-coupled device ("CCD") image sensor), monochrome camera, IR camera, event-based camera, and/or the like. In various implementations, the one or more image sensor systems 1214 further include illumination sources that emit light upon the portion of the face of the user, such as a flash or a glint source.

The memory 1220 includes high-speed random-access memory, such as DRAM, SRAM, DDR RAM, or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium. In some implementations, the memory 1220 or the non-transitory computer readable storage medium of the memory 1220 stores the following programs, modules and data structures, or a subset thereof including an optional operating system 1230, an Immersion module 1240, and a user data store 1260.

The operating system 1230 includes procedures for handling various basic system services and for performing hardware dependent tasks. In some implementations, the Immersion module 1240 is configured to manage and coordinate one or more MR experiences for one or more users at various levels of Immersion (e.g., a single MR experience for one or more users, or multiple MR experiences for respective groups of one or more users). To that end, in various implementations, the Immersion module 1240 includes a data obtaining unit 1242, an MR presenting unit 1244, an eye tracking unit 1246, and a data transmitting unit 1248.

In some implementations, the data obtaining unit 1242 is configured to obtain data (e.g., presentation data, interaction data, sensor data, location data, etc.) from one or more computing devices external to device 110. To that end, in various implementations, the data obtaining unit 1242 includes instructions and/or logic therefor, and heuristics and metadata therefor.

In some implementations, the MR presenting unit 1244 is configured to present MR content via the one or more displays 1212. To that end, in various implementations, the MR presenting unit 1244 includes instructions and/or logic therefor, and heuristics and metadata therefor.

In some implementations, the eye tracking unit 1246 is configured to determine an eye tracking characteristic of a user based on image data received from an image sensor. To that end, in various implementations, the eye tracking unit 1246 includes instructions and/or logic therefor, and heuristics and metadata therefor.

In some implementations, the data transmitting unit 1248 is configured to transmit data (e.g., presentation data, location data, etc.) to one or more computing devices external to device 110. To that end, in various implementations, the data transmitting unit 1248 includes instructions and/or logic therefor, and heuristics and metadata therefor.

Although the data obtaining unit 1242, the MR presenting unit 1244, the eye tracking unit 1246, and the data transmitting unit 1248 are shown as residing on a single device (e.g., device 110), it should be understood that in other implementations, any combination of the data obtaining unit 1242, the MR presenting unit 1244, the eye tracking unit 1246, and the data transmitting unit 1248 may be located in separate computing devices.

FIG. 12 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device with a display, and a knob that is part of the electronic device:
        presenting, on the display, a simulated reality (SR) environment at a first immersion level, wherein the first immersion level is associated with a first location of a reality boundary, and wherein physical content associated with a physical setting and virtual content are presented in the SR environment based on a size of the reality boundary;
        detecting rotation of the knob; and
        in response to detecting rotation of the knob, presenting the SR environment at a second immersion level, wherein the second immersion level is associated with a second location of the reality boundary that is different from the first location of the reality boundary.

2. The method of claim 1, wherein the knob is a control knob that is configured to send input representing a request to change the first immersion level to the second immersion level based on the rotation of the knob.

3. The method of claim 1, wherein the knob is rotatable in at least two different directions.

4. The method of claim 3, wherein a first input from a first rotation in a first direction of the knob is different than a second input from a second rotation in a second direction of the knob.

5. The method of claim 1, wherein the knob is configured to transition from only presenting first content on the display, to presenting a combination of the first content and second content on the display, to presenting only the second content on the display in a continuous manner based on continuous movement of the knob, wherein the second content is different than the first content.

6. The method of claim 1, wherein the knob is configured to transition from only presenting first content on the display, to presenting a combination of the first content and second content on the display, to presenting only the second content on the display in discrete steps based on movement of the knob into a sequence of discrete positions, wherein the second content is different than the first content.

7. The method of claim 1, wherein a mechanical resistance of the knob varies as the electronic device approaches a first state in which only first content is presented on the display and a second state in which only second content is presented on the display, wherein the second content is different than the first content.

8. The method of claim 1, wherein the knob is configured to physically detach from the electronic device and is adapted to remain communicatively coupled with the electronic device when physically detached from the electronic device.

9. The method of claim 1, wherein a distance of the reality boundary from a viewpoint position within the SR environment differs between the first location and the second location.

10. The method of claim 9, wherein, based on the second location of the reality boundary differing from the first location of the reality boundary, a first portion of the SR environment is different than a previous version of the first portion and a second portion of the SR environment is different than a previous version of the second portion.

11. The method of claim 1, wherein real content of a physical setting and virtual content are presented in the SR environment based on the first location and the second location of the reality boundary.

12. The method of claim 1, wherein the second immersion level displays more real content and less virtual content than the first immersion level.

13. The method of claim 1, wherein the second immersion level displays less real content and more virtual content than the first immersion level.

14. The method of claim 1, wherein virtual content is only presented on one side of the reality boundary.

15. The method of claim 1, wherein real content is only presented on one side of the reality boundary.

16. The method of claim 1, wherein the reality boundary is a circular boundary defined by a distance away from a viewpoint position, wherein the distance of the circular boundary from the viewpoint position differs between the first location and second location of the reality boundary.

17. The method of claim 1, wherein the knob is disposed on an exterior surface of the electronic device and comprises a hardware input device.

18. The method of claim 1, wherein the electronic device is a head-mounted device.

19. The method of claim 1, wherein physical content associated with a physical setting and virtual content are presented in the SR environment based on a location of the reality boundary with respect to a viewpoint position.

20. The method of claim 1, wherein the reality boundary transitions radially from the first immersion level to the second immersion level.

21. The method of claim 1, wherein the reality boundary is curved.

22. The method of claim 1, wherein the reality boundary expands or decreases to gradually change an amount of physical content and virtual content presented during a transition from the first immersion level to the second immersion level.

23. A system comprising:
    a non-transitory computer-readable storage medium; and
    one or more processors coupled to the non-transitory computer-readable storage medium, wherein the non-transitory computer-readable storage medium comprises program instructions that, when executed on the one or more processors, cause the one or more processors to perform operations comprising:

presenting, on a display of an electronic device, a simulated reality (SR) environment at a first immersion level, wherein the first immersion level is associated with a first location of a reality boundary, wherein the electronic device comprises a knob, and wherein physical content associated with a physical setting and virtual content are presented in the SR environment based on a size of the reality boundary;

detecting rotation of the knob; and in response to detecting rotation of the knob, presenting the SR environment at a second immersion level, wherein the second immersion level is associated with a second location of the reality boundary that is different from the first location of the reality boundary.

24. A non-transitory computer-readable storage medium, storing program instructions computer-executable on a computer to perform operations comprising:

presenting, on a display of an electronic device, a simulated reality (SR) environment at a first immersion level, wherein the first immersion level is associated with a first location of a reality boundary, wherein the electronic device comprises a knob, and wherein physical content associated with a physical setting and virtual content are presented in the SR environment based on a size of the reality boundary;

detecting rotation of the knob; and in response to detecting rotation of the knob, presenting the SR environment at a second immersion level, wherein the second immersion level is associated with a second location of the reality boundary that is different from the first location of the reality boundary.

* * * * *